Figure 1:
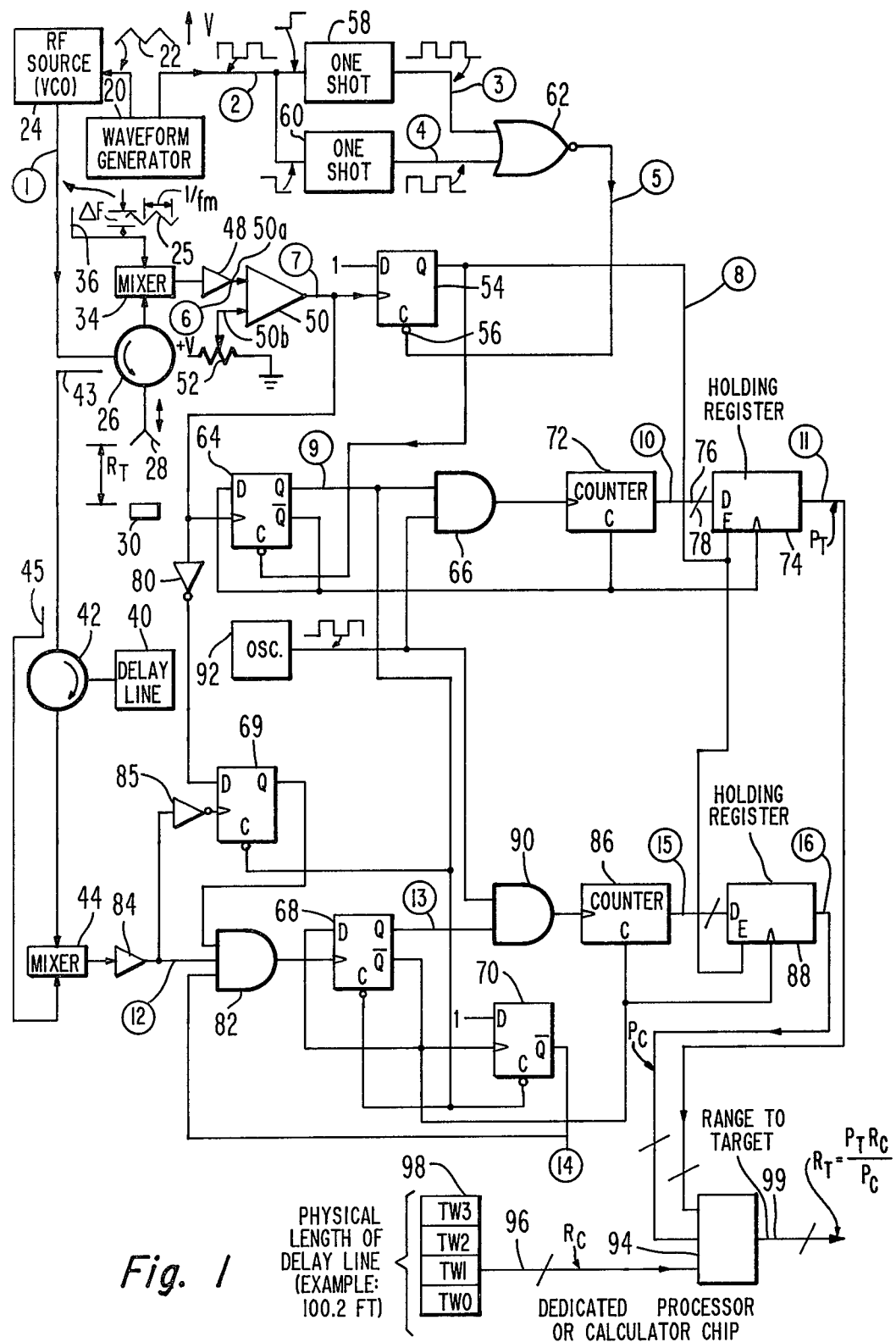

United States Patent [19]

Kipp

[11] 4,435,712

[45] Mar. 6, 1984

[54] FM-CW RADAR RANGING SYSTEM WITH SIGNAL DRIFT COMPENSATION

[75] Inventor: Ronald W. Kipp, Croydon, Pa.

[73] Assignee: RCA Corporation, New York, N.Y.

[21] Appl. No.: 292,573

[22] Filed: Aug. 13, 1981

[51] Int. Cl.³ .............................................. G01S 7/40
[52] U.S. Cl. ...................................... 343/17.7; 343/14
[58] Field of Search .................................. 343/14, 17.7

[56] References Cited

U.S. PATENT DOCUMENTS

| | | | |
|---|---|---|---|
| 3,341,849 | 9/1967 | Cordry et al. | 343/17.7 |
| 4,008,475 | 2/1977 | Johnson | 343/14 |
| 4,044,353 | 8/1977 | Levy | 343/12 R |
| 4,044,355 | 8/1977 | Edvardsson | 343/14 |
| 4,106,020 | 8/1978 | Johnson | 343/14 |
| 4,245,221 | 1/1981 | Kipp et al. | 343/17.7 |

Primary Examiner—Maynard R. Wilbur
Assistant Examiner—M. R. Gordon
Attorney, Agent, or Firm—J. S. Tripoli; R. L. Troike; R. E. Smiley

[57] ABSTRACT

A frequency-modulated continuous-wave (FM-CW) ranging system produces a first signal of frequency corresponding to the measured range of a target which signal is sometimes below a given quality and produces a second signal of frequency corresponding to the measured range of a simulated target of known range. A threshold detector determines when the target signal is above the given quality at which time the period of the first signal is determined from a given cycle thereof while concurrently the period of the second signal is determined from which the range to the target can be computed.

10 Claims, 2 Drawing Figures

FM-CW RADAR RANGING SYSTEM WITH SIGNAL DRIFT COMPENSATION

The present invention relates to frequency-modulated continuous-wave (FM-CW) ranging systems with modulation rate drift and frequency excursion drift compensation and, in particular, to such systems which provide range information only when the range indicating signal is of a predetermined quality.

FM-CW radar ranging interrogating systems are well-known in the art. In such systems, a radio frequency (RF) interrogation signal, frequency modulated with a given modulation waveform, is transmitted toward a target and reflected therefrom back to the interrogating system. The reflected signal as received at the interrogating system is delayed in time, and hence shifted in frequency, from the instantaneous interrogation signal by an amount ($\tau$) proportional to the range (R) of the target. For example, when the interrogation signal comprises an RF signal modulated by a triangular waveform having a peak value of $\Delta F$ and a period of $1/f_m$, the frequency shift or difference frequency $f_R$ (also commonly known as beat frequency) as generated by a suitable filtered mixer receptive of the reflected signal and a signal indicative of the interrogation signal, is equal to the time derivative of the frequency of the interrogation signal times the round trip time delay, $\tau$, and may be expressed as:

$$f_R = df/dt \cdot \tau = 4R(\Delta F \cdot f_m)/C \tag{1}$$

where C is the speed of light. The range, R, or distance between the target and the interrogating system and, additionally, the range rate of the target relative to the system is determined by measurement of the frequency shift $f_R$. Rearranging formula (1) provides the formula for range.

$$R = f_R \cdot C / 4(\Delta F \cdot f_m) \tag{2}$$

or $$R = K \cdot f_R \tag{3}$$

where $$K = C/4(\Delta F \cdot f_m), \tag{4}$$

If $\Delta F$ is of a fixed value with a fixed rate of change and if $f_m$ is of fixed value, K remains constant.

In practice, such FM-CW radar ranging systems have been plagued with errors due to drifts in the maximum frequency excursion ($\Delta F$) and/or period ($1/f_m$) of the frequency modulation waveform. Such drifts are often caused merely by changes in ambient conditions such as temperature, power supply variations and timing circuit drifts.

U.S. Pat. No. 4,106,020 is directed to an FM-CW ranging system for transmitting the FM-CW signal simultaneously to a target and to a delay simulating a target at a predetermined range. A first signal consisting substantially of difference signals of frequency corresponding to the predetermined range and a second signal consisting substantially of difference signals of frequency corresponding to the range to target are generated. The two signals and the predetermined range are used to calculate the actual range to the target. Such a system, because it simultaneously measures frequencies corresponding to the range of the real target and simulated target over a considerable period of time, accurately compensates for changes in $\Delta F$ and $f_m$ and nonlinearities of the modulating signal so long as both the first and second signals are simultaneously present.

In a practical system in which the ranging system of U.S. Pat. No. 4,106,020 is utilized, it has been found through experimentation that the real target difference signal is often not present or is deformed due to what is known as phase cancellations such as to provide no useful information for relatively long intervals. Thus, since the real target difference signal is not always present, it is not subject to the same spectrum of nonlinearities of the modulating signal as is the target simulating delay line, an inaccurately computed real target distance results. In the prior art circuit represented by U.S. Pat. No. 4,106,020 additional circuitry, not shown therein, compensates for the experimentally determined losses of target signal to give a range accuracy within $\pm 0.15$ meters of the true target range for targets ranging from 5 to 15 meters. Such accuracy is not acceptable in many ranging applications.

In accordance with a preferred embodiment of the present invention an FM-CW ranging system with a calibrate delay line of known electrical length $R_C$ for detection of range to a target includes means for producing an FM-CW radio frequency signal for transmitting simultaneously to the target and delay line and means for mixing the transmitted signal and the return signals from the target and delay line to obtain a target beat frequency signal and the calibration beat frequency signal. Means responsive to the target signal provides a control signal to indicate that the target signal is of at least a given quality. Means are responsive to the control signal and target signal to determine from a given cycle of target beat frequency signal a signal of value $P_T$ indicative of the period of the target signal. Means are responsive to the control signal and to at least one cycle of the calibration beat frequency signal occurring concurrently with said given cycle for determining a signal of value $P_C$ indicative of the period of the calibration signal. Means are responsive to signals $P_C$, $P_T$, $R_C$ for computing the target range $R_T = R_C \cdot P_C / P_T$.

Figure 2:
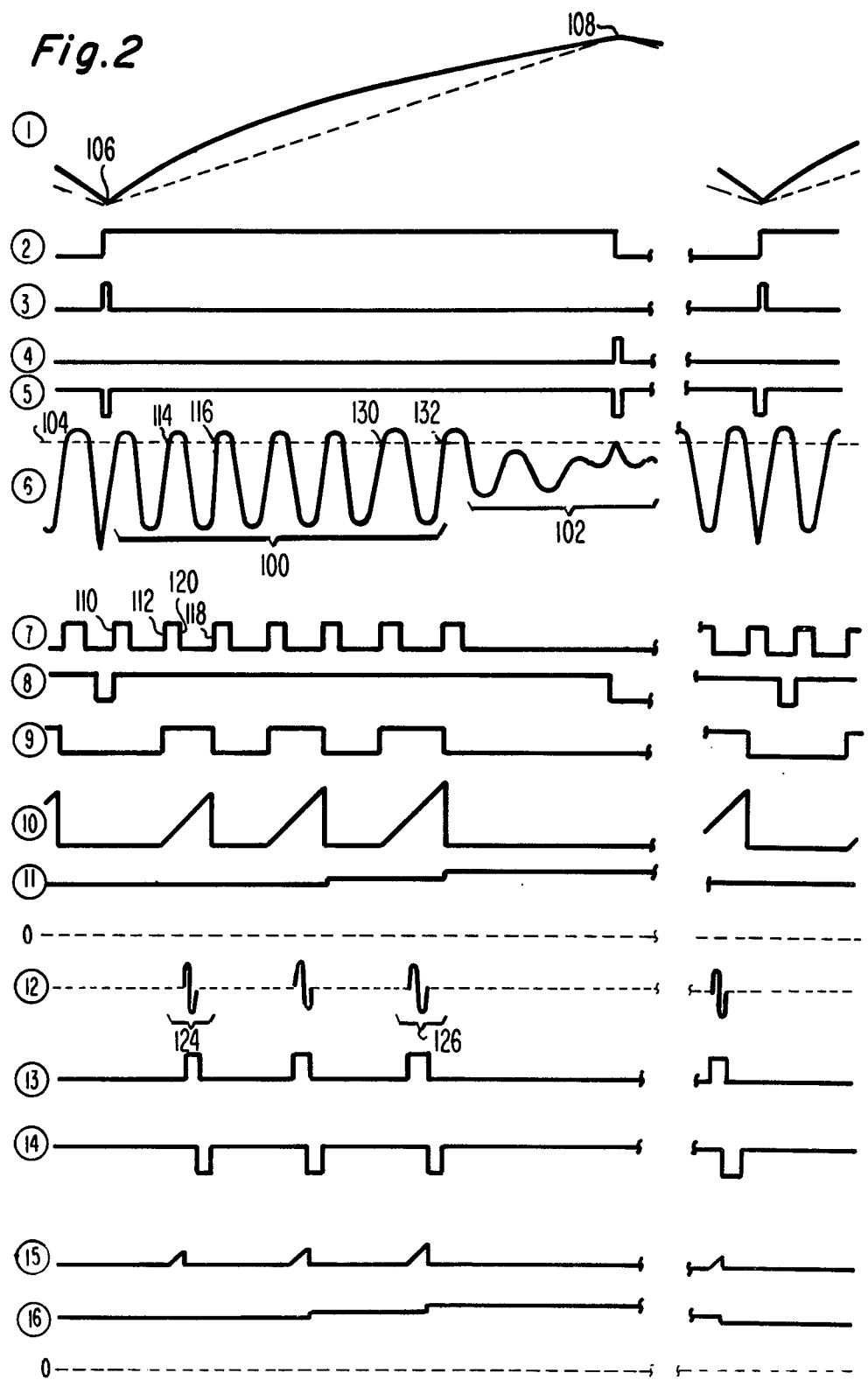

In the drawing:

FIG. 1 is a block diagram of an FM-CW radar system in accordance with a preferred embodiment of the present invention; and FIG. 2 is a set of waveforms useful in understanding the operation of the system of FIG. 1. In FIG. 1, a modulating source such as a waveform generator 20, which produces a triangular waveform 22 illustrated with voltage amplitude on the vertical axis and time on the horizontal axis, is coupled to a modulatable radio frequency source 24 for purposes of modulating the radio frequency signal produced by source 24 in accordance with waveform 22. RF source 24 typically may comprise a voltage controlled oscillator which, in response to triangular modulating waveform 22, produces a waveform 25 of frequency on the vertical axis and time on the horizontal axis waveform 25 has a maximum excursion $\Delta F$ with a period $1/f_m$ riding on a carrier of typically 10 megahertz.

Waveform 25 appears at the circular terminal with the number 1 inside. The waveform produced at terminal 1 and waveforms produced at other numbered terminals in FIG. 1 are illustrated in FIG. 2 opposite the respectively numbered circles. Hereinafter reference to a specific waveform of FIG. 2 will be referred to by the word "waveform" followed by its number without special reference to FIG. 2.

As illustrated in dashed lines, waveform 1 is ideally a linear triangular waveform. In reality, the waveform, as illustrated in a solid line, is almost always nonlinear. The downwardly extending portion of the waveform, which is broken in waveform 1 due to space limitations, is a mirror image of the upwardly extending portion. The nonlinearities may be due to nonlinearities in the signal produced by waveform generator 20 or in the signal produced by source 24 or a combination of both. The real waveform illustrated as a solid line may be above the ideal waveform (dashed line) as illustrated in waveform 1 or may be below the ideal waveform or may meander from one side of the ideal waveform to the other.

Source 24 is coupled to a suitable three port circulator 26. Circulator 26 is coupled to an antenna 28 which may be a printed circuit corporate feed antenna of the type described in U.S. Pat. No. 3,587,110, issued June 22, 1971, to O. M. Woodward or a standard horn antenna such as a Narda Model 640. FM-CW signals from antenna 28 are directed to and reflected from suitably disposed targets such as target 30 within the pattern of antenna 28. The return signals to antenna 28 are passed by circulator 26 to a means for deriving target difference frequency signals, $f_T$, notably a conventional mixer 34 such as the Aneren Model 7G0118. Mixer 34 is also receptive of a sample of the radio frequency source 24 output signal provided by a directional coupler 36 in the line between RF source 24 and circulator 26.

A means simulating a target at a known distance such as a calibrating delay line 40 used in the reflection mode is coupled to three port circulator 42. Circulator 42 is connected to a directional coupler 43 coupled to receive energy from source 24. Thereby energy is coupled from the RF source 24 into the delay line 40 wherein it is delayed and reflected back through circulator 42 into a second mixer 44. Directional coupler 45 is also coupled to mixer 44 to pass a portion of signal from RF source 24 thereto. Delay line 40 may be of the acoustic type or simply a coaxial line. The round trip electrical length $R_C$ of delay line 40 is chosen to be long compared to the most distant target range capability determined by the equipment sensitivity or physical limitations of real target location. In one exemplary system, target ranges of interest, e.g., 6.0 to 18.5 meters, from antenna 28 result in the production of a frequency $f_T$ from mixer 34 having a value typically between 13 and 40 kilohertz (kHz) while the value of the frequency $f_C$ from mixer 44 associated with delay 40 is typically 98 kHz. However, as illustrated in waveform 12, the frequency varies depending upon the actual slope of waveform 1. Near turnaround point 106 of waveform 1, where the actual slope is greater than the ideal slope (dashed line), the frequency from mixer 44 is relatively high (period relatively short) compared to the frequency from mixer 44 near turnaround point 108 of waveform 1. Near turnaround point 108 the actual slope is less than the ideal slope and, consequently, the frequency from mixer 44 is relatively low (period relatively long). See, for example, waveform 12, region 126.

It will be realized that the various waveforms in FIG. 2 are not to scale. In particular, the nonlinearity of waveform 1 is greatly exaggerated. Also in waveform 12, the actual frequency range is not nearly as great as illustrated therein. In one actual embodiment, the frequency range is 96 to 101 kHz with the average being 98 kHz.

The output of mixer 34 is coupled to amplifier 48 which is coupled to a means for detecting the quality of the beat frequency signal produced by mixer 34 such as one input 50a of a threshold detector 50. A second input 50b of threshold detector 50 is connected via a potentiometer 52 to a voltage source (not shown). Threshold detector 50 is of the type which produces a logic zero output when the potential at input 50a is lower than that at input 50b and otherwise produces a logic one. Potentiometer 52 is set experimentally by observing signals at the output of amplifier 48 and setting the potentiometer 52 such that detector 50 passes known good signals.

The output of threshold detector 50 is coupled to the clock input of a D-type flip-flop (FF) 54. The clock input terminal is denoted by a symbol similar to the letter V pointing away from the input to denote that the FF is clocked by a change in state of the input signal applied thereto from a logic zero to a logic one to produce an output at the Q terminal of value equal to that applied to the D terminal. The C symbol also in FF 54 and others is the clear terminal. A logic zero applied there causes the FF to be reset such that the Q terminal produces a logic zero. Thus, for FF 54 whenever the C terminal is at logic zero the Q terminal is at logic zero. When the C terminal is at logic one and a change from logic zero to logic one occurs at the clock terminal, terminal Q will change to the logic level at terminal D, in this case a logic one because terminal D is at a logic one. In flip-flop 54 terminal Q will remain a logic one until a logic zero is applied at terminal C because terminal D is always at a logic one level.

Waveform generator 20, in addition to producing waveform 22, also produces a squarewave waveform 2 which is applied to the input terminals of one-shots 58 and 60, respectively. As illustrated in FIG. 2, waveforms 1 and 2 are of the same period and have coincident turnaround points. Waveform 2 alternates between logic one and logic zero. One-shot 58 is responsive to an input signal change from a logic zero to a logic one to produce a momentary logic one output pulse as a waveform 3. One-shot 60 is responsive to a change in input signal from a logic one to a logic zero for producing a momentary logic one output pulse as indicated in waveform 4. One-shots 58 and 60 are coupled to respective inputs of a NOR gate 62.

NOR gate 62 produces an output, waveform 5, the period of which is one-half of the period of either waveform 1 or waveform 2.

NOR gate 62 is coupled to the C terminal of flip-flop 54. The Q output of flip-flop 54 is coupled to the C input of flip-flop 64 and the output of threshold detector 50 is coupled to the clock terminal of flip-flop 64. The Q output terminal of flip-flop 64 is coupled to one input of AND gate 66 and to the C terminals of flip-flops 68, 69 and 70. The $\overline{Q}$ terminal of flip-flop 64 is coupled to the D terminal thereof, to the clear terminal of a counter 72 and to the clock terminal of a holding register 74. The output of the AND gate 66 is coupled to the clock input of counter 72.

The output of digital counter 72 is coupled to the data input terminal (D) of holding register 74 via multi-conductor line 76. All such multi-conductor lines are indicated with a cross-hatch symbol such as 78. The output of threshold detector 50 is coupled to an inverter 80 which is coupled to the D input of flip-flop 69. The Q output of flip-flop 69 is coupled to one input of an AND gate 82. The output of mixer 44 is coupled to an amplifier 84 which, in turn, is coupled to a second input of AND gate 82, and to an inverter 85 which is in turn coupled to the clock input of flip-flop 69. The $\overline{Q}$ output of D-type flip-flop 70 is coupled to the third input of AND gate 82.

The output of AND gate 82 is coupled to the clock input of flip-flop 68. The $\overline{Q}$ output of flip-flop 68 is coupled to the D input of that flip-flop, to the clock input of flip-flop 70, to the C input of a counter 86 and to the clock input of a holding register 88. The Q output of flip-flop 68 is coupled to one input of an AND gate 90 the output of which is coupled to the clock input of counter 86. Counter 86 is connected by a multi-conductor cable to the D terminal of register 88. An oscillator 92 is coupled to a second input of AND gate 66 and AND gate 90.

The frequency of oscillator 92 is much greater than the frequency of the signal produced either by mixer 34 or mixer 44. In a typical application, mixer 34 may produce frequencies on the order of 10 kHz, mixer 44 may produce signals on the order of 100 kHz and oscillator 92 may produce a frequency on the order of 10,000 kHz.

The outputs of holding registers 74 and 88 are coupled via multi-conductor cables to respective inputs of a computing circuit 94. Computing circuit 94 also receives on line 96 from a source such as thumbwheel switches 98 an indication of the actual length $R_C$ of delay line 40. This indication may be, for example, a binary signal representing the length of delay of line 40.

As will be described shortly, holding register 74 produces an output signal of value indicative of the period of the beat frequency signal from mixer 34 designated $P_T$ while holding register 88 produces a digital signal of value indicative of the period of the beat frequency signal produced by mixer 44 and designated $P_C$. The purpose of computing device 94 is to determine the actual range $R_T$ between target 30 and antenna 28. Computing device 94 may take many forms. It may, for example, be a programmed microprocessor chip or a calculator chip, it may be dedicated hardware or it may be a chip for making the multiplication and division calculations such as the model TMS-1017 or TMS-1018 manufactured by the Texas Instruments Company.

In operation, $R_F$ source 24 produces a triangularly modulated $R_F$ signal (waveform 1) which is transmitted through (in both directions) unterminated delay line 40 and is simultaneously radiated by antenna 28 toward targets such as 30. Return signals from target 30 are received at antenna 28 and, along with signals reflected from delay line 40, are passed by respective circulators 26 and 42 to respective mixers 34 and 44. These mixers also receive a sample of the transmit $R_F$ signal via couplers 36 and 45, respectively.

The beat frequency signal produced by mixer 34, as amplified by amplifier 48, is ideally a sinewave of uniform amplitude and period (frequency). If the period or frequency can be determined and if $f_m$ and $\Delta F$ are known, even if nonlinear, $R_T$ can easily be calculated utilizing equation 2. In practice the modulated waveform 1 is nonlinear and the signal from mixer 34 is not of uniform amplitude and period, but rather is something like waveform 6 having portions such as 100 which are non-phase cancelled and amplitude and portions such as 102 which are phase cancelled. Although not illustrated in FIG. 2 due to space limitations the portion of waveform 6 associated with the downwardly extending portion of waveform 1 and is a mirror image of that which is illustrated. In a realistic environment portion 100 may be expected to occur approximately 10 percent of the time and portion 102 may be expected to occur approximately 90 percent of the time. The signal distortion is caused by phase cancellations which occur when energy reflected from a target such as 30 is cancelled or partially cancelled by energy being transmitted toward the target.

Therefore in accordance with the invention, threshold detector 50 is responsive to the beat signal produced by amplifier 48 for producing a logic one output only when amplifier 48 produces a signal above a voltage determined by the setting of potentiometer 52 such as indicated by dotted line 104 on waveform 6 and otherwise produces a logic zero. Concurrently, waveform generator 20 produces a squarewave signal, waveform 2, of period identical to that of the modulation waveform 1 and having change of potential points corresponding with the turnaround points of modulation waveform 1 (negative going to positive going, e.g. 0.106, and positive going to negative going, e.g. 0.108). The squarewave signal produced by waveform generator 20 is applied to one-shots 58 and 60 which along with NOR gate 62 cause short duration negative going pulses to occur coinciding in time with each of the turnaround points of waveform 1. The narrow negative-going pulses are therefore of period $1 \div 2 \cdot f_m$, as illustrated in waveform 5. The negative pulses, waveform 5, are applied to the C terminal of flip-flop 54 to reset the flip-flop (Q=logic zero) at the beginning of each turnaround point of waveform 1 and to force the flip-flop into a cleared state for a given period of time determined by the duration of pulses from NOR gate 62. This time which is determined by the duration of pulses from one-shots 58 and 60 insures that the signal produced by mixer 34 at the turnaround points of waveform 1, which is typically distorted, will not be used to calculate the period of waveform 6. By way of example, for signals produced by mixer 34 with periods of approximately 25 $\mu$ or greater, pulses from NOR gate 62 of 10 $\mu$s are suitable.

The positive going edge (line 110, waveform 7) of the first pulse from detector 50 following the termination of a reset pulse at the C terminal of flip-flop 54 causes it to become set (Q=logic one). The logic one signal from the Q terminal of flip-flop 54 removes the reset pulse from the C terminal of flip-flop 64 but not in time for the leading edge 110 of waveform 7 to cause flip-flop 64 to be set. The next leading edge 112 of waveform 7 corresponding to the crossing of the beat frequency waveform 6 above line 104 at point 114 along with the logic one from the $\overline{Q}$ terminal of flip-flop 64 applied to the D terminal thereof causes the flip-flop to become set. From an inspection of waveforms 6, 7 and 9 it will be seen that the operation of flip-flop 54 is such as to cause the first cycle of waveform 6 following the turnaround of waveform 1 at point 106 to be ignored by flip-flop 64. Thus, flip-flop 54 is termed a "throw-away" flip-flop. The purpose of flip-flop 54 is to insure that the first cycle of waveform 6, which may be of atypical period, is not processed by flip-flop 64 and the following circuits.

Flip-flop 64 remains set until waveform 6 passes through one more cycle and again crosses line 104 at point 116 at which time the positive going portion 118 of waveform 7 with the logic zero $\overline{Q}$ signal of flip-flop 64 applied to the D terminal thereof causes the flip-flop to reset. Thus, flip-flop 64 is a toggle flop alternately setting and resetting to mark all full cycles of waveform 6.

When flip-flop 64 is set corresponding to one complete cycle of waveform 6, AND gate 66 is primed to pass counting pulses from oscillator 92 to the clock or counting terminal of counter 72. The logic zero from the $\overline{Q}$ terminal of set flip-flop 64 applied to the clear terminal of counter 72 enables the counter to accept pulses at its clock terminal and count each pulse so received. The counter was previously reset by a logic one signal from the $\overline{Q}$ terminal of the flip-flop 64 when the flip-flop was reset. Waveform 10 illustrates the incrementing count in counter 72 as being in analog form. In reality the counter is digital in nature.

When flip-flop 64 becomes reset corresponding to leading edge 118 of waveform 7, AND gate 66 is again blocked and the count in counter 72 represents the period of waveform 6 specifically as measured between points 114 and 116 thereof.

When flip-flop 64 is reset by leading edge 118 of waveform 7, the resulting logic one from the Q terminal thereof clears counter 72 but simultaneously causes the transfer of the count contained therein to holding register 74. Thus, at this time, holding register 74 contains a value representing the period $P_T$ of waveform 6. For reasons having to do with the symmetry of waveform 1 about point 106 and therefore the symmetry of waveform 6, the period determined just before the turnaround point 106 is substantially identical to that determined for the cycle beginning at point 114 and ending at point 116. Thus, there is no change in waveform 11.

Concurrently with the operation of flip-flop 64, AND gate 66, counter 72 and holding register 74, the signals produced by detector 50 as inverted by inverter 80 are applied to the D input of flip-flop 69 which cannot become set until flip-flop 64 is set thus removing the logic zero reset signal from flip-flop 69.

When the Q terminal of flip-flop 64 goes to a logic one as a result of its being set by the rising edge 112 of waveform 7, for example, the clear pulse is removed from flip-flops 68, 69 and 70. At that time, however, a logic zero from inverter 80 resulting from the logic 1 pulse from detector 50 causes flip-flop 69 to remain reset to thus block AND gate 82. Thereafter, on the next successive falling edge, 120, of waveform 7, the resultant logic zero from detector 50 causes a logic one output to be applied from inverter 80 to the D input of flip-flop 69. With a logic one on the D input the next positive-going signal at the clock input, resulting from a negative portion of a beat cycle from amplifier 84, causes flip-flop 69 to set. With flip-flop 69 set the resulting logic one from its Q terminal primes AND gate 82 which already is receiving a logic one from the $\overline{Q}$ terminal of flip-flop 70. The purpose of flip-flop 69 is to ensure that AND gate 82 is primed when a negative signal is applied thereto by mixer 84. If, for example, the output of inverter 80 were connected directly to AND gate 82, gate 82 could be primed while amplifier 84 was producing any point of the positive part of a beat frequency cycle and upon the priming of AND gate 82 flip-flop 68 would immediately become set. Since, as will be described more fully hereinafter, the purpose of flip-flop 68 is to mark the occurrence of one full cycle of beat frequency signal, a random time of becoming set is intolerable. It will be noted that AND gate 82 becomes primed at approximately the middle of the waveform 6 cycle commensing at point 114 and terminating at point 116. The significance of this fact will be brought hereinafter.

AND gate 82, thus primed by logic one signals from flip-flop 69 and the $\overline{Q}$ terminal of flip-flop 70, is responsive to the next positive part of a beat frequency cycle from amplifier 84, waveform for setting flip-flop 68. The resulting logic one signal from the Q terminal of flip-flop 68 primes AND gate 90 to accept pulses from oscillator 92 to provide counting pulses to counter 86. Furthermore, the logic zero from the $\overline{Q}$ terminal of flip-flop 68 removes the clear pulses from counter 86 and holding register 88. Counter 86 therefore continues to count oscillator pulses so long as flip-flop 68 remains set.

Flip-flop 68 remains set until the following positive going signal from amplifier 84, marking the completion of one cycle of beat frequency from mixer 44, toggles flip-flop 68 to its reset state. At that time the Q terminal thereof goes to a logic zero to block AND gate 90 and the $\overline{Q}$ terminal thereof goes to a logic one which causes flip-flop 70 to be set. As a result of flip-flop 68 being reset, the logic one at the Q terminal thereof clears counter 86 but at the same time clocks the resulting count into holding register 88, a count which represents the period $P_C$ of the beat frequency signal produced by mixer 44. Furthermore, the logic one from the $\overline{Q}$ terminal of flip-flop 70 blocks AND gate 82 preventing flip-flop 68 from again becoming set until flip-flop 70 is reset.

As mentioned previously, since delay line 40 has an electrical length much in excess of any expected target range, the beat frequency produced by mixer 44 will be much higher than the frequency produced by the mixer 34 and consequently, the period of the mixer 44 beat frequency signal will be much smaller than the period of the beat frequency signal from mixer 34. Because the period of the mixer 44 beat frequency is taken at the approximate center of the time that the period of beat frequency for mixer 34 is being determined, any nonlinearity of the modulated signal, waveform 1, equally affects both the real target beat frequency and simulated target beat frequency.

Once the count representing the period of beat frequency produced by mixer 44 is stored in holding register 88 and the count representing the period of beat frequency produced by mixer 34 is stored in holding register 74, computing circuit 94, receptive of the counts stored in the two holding registers and a signal from switch 98 indicative of the actual electrical length of delay line 40, can easily calculate the actual range $R_T$ to target 30 as follows:

$$R_T = R_C (P_C/P_T). \tag{5}$$

Since the period $P_T$ of the target beat frequency signal and period $P_C$ of the calibrating delay line beat frequency signal are, as previously mentioned, affected by the same nonlinearities of the modulating signal, the nonlinearities are cancelled in accordance with equation 5. Therefore, if target 30 remains stationary relative to antenna 28, a range calculation at a different point in the modulation cycle from that just described, such as between lines 130 and 132 of waveform 6, will result in the same value of range $R_T$ being computed. This is so because the nonlinearity which affects the delay line beat frequency causing it to be lower in value than for the previous calculations (Compare waveform 12, regions 124 and 126.) equally affects the target beat frequency signal causing it to be lower in frequency than for the cycle above described. Said another way, the space between lines 130 and 132, waveform 6 is greater than the space between lines 114 and 116 but the periods of respective cycles of waveform 12 are also equivalently affected.

So long as there are successive full amplitude cycles of waveform 6, the process above-described repeats for every other cycle of waveform 6. Should there be less than a full cycle, toggle flop 64, once set, will be reset at the turn-around point such as 108 of waveform 1 by a logic zero signal from flip-flop 54. Flip flop 54 in turn is reset by the presence of a pulse from NOR gate 62 marking the turn-around point 108. Likewise, when flip-flop 54 is reset, holding registers 74 and 88 are disabled by a logic zero pulse as applied to the E (enable) terminal thereof. Thus, processor 94 will not calculate any erroneously short or overerroneously long target ranges.

It will be understood that the circuitry which determines a single period of frequency produced by mixer 44 during the time which a single period of signal corresponding to the beat frequency signal produced by mixer 34 is being determined, namely elements 68, 69, 70, 82, 85, 86, 88 and 90, could be replaced by circuitry which would determine successive periods of mixer 44 beat frequency during the entire time that the period of beat frequency for mixer 34 is being determined and that period could then be averaged by calculator circuit 94 to provide a slightly more accurate indication of target range. Such a circuit, however, involves more components than those shown and for most applications is not necessary.

Furthermore, it will be understood that threshold detector 50 is only one means of determining the quality of the signal produced by mixer 34. It is possible to have more complex circuitry substituted for threshold detector 50 which measures other attributes of waveform 6 such as negative excursions thereof and peak to peak amplitude, etc. Nevertheless, for most applications, a simple threshold detector is satisfactory.

What is claimed is:

1. A frequency modulated-continuous wave (FM-CW) ranging system including a calibration means for simulating a target of known electrical length $R_C$, said system determining range $R_T$ to a real target comprising in combination:
   means for producing an FM-CW radio frequency signal;
   means for transmitting said FM-CW signal to said real target and for receiving return signals therefrom delayed in accordance with the target range;
   means for transmitting said FM-CW signal to said calibration means concurrently with its transmission to said target and for receiving return signals from said calibration means delayed in accordance with the simulated range thereof;
   means for mixing the transmission signal and return signal from said real target to produce a real target beat frequency signal, the frequency of which is indicative of range to said target;
   means for mixing the transmission signal and return signal from said calibration means to produce a calibration beat frequency signal, the frequency of which is indicative of range simulated by said calibration means;
   means responsive to the real target beat frequency signal representative of said real target range for producing a control signal only when said real target beat signal is of at least a given quality;
   means responsive to said control signal and to a given cycle of said real target beat frequency signal for determining a signal of value $P_T$ indicative of the period of said real target beat frequency signal only when said control signal is present;
   means responsive to at least a selected cycle of said calibration beat frequency signal occurring during the same time said given cycle of real target beat frequency occurs for determining a signal of value $P_C$ indicative of a period of the calibration beat frequency signal; and
   means responsive to said signal of value $P_T$, signal of value $P_C$ and calibrated range $R_C$ for determining said target range $R_T$.

2. The combination as set forth in claim 1 wherein said means producing said control signal comprises a means detecting a voltage threshold for producing said control signal when said threshold is exceeded.

3. The combination as set forth in claim 1 wherein said means for determining a signal of value $P_T$ indicative of the period of said real target beat frequency signal comprises means producing a signal indicative of the start and end of said given cycle, means producing periodic pulses at a period much shorter than said period $P_T$, and means responsive to said periodic pulses and said signal indicative of said start and end for counting said periodic pulses from said start to said end, the count of said pulses at said end corresponding to said value $P_T$.

4. The combination as set forth in claim 2 wherein said means for determining a signal of value $P_T$ indicative of the period of said real target beat frequency signal comprises means producing a signal indicative of the start and end of said given cycle, means producing periodic pulses at a period much shorter than said period $P_T$, and means responsive to said periodic pulses and said signal indicative of said start and end for counting said periodic pulses from said start to said end, the count of said pulses at said end corresponding to said value $P_T$.

5. The combination as set forth in claim 3 wherein said means for determining a signal of value $P_C$ indicative of a period of said calibration beat frequency signal comprises means for determining the start and end of said selected cycle of said calibration beat frequency, second means for producing second periodic pulses at a period much greater than said period $P_C$, means for counting said second periodic pulses between said start and said end of said calibration beat frequency cycle, the count at said end corresponding to said value $P_C$.

6. The combination as set forth in claim 4 wherein said means for determining a signal of value $P_C$ indicative of a period of said calibration beat frequency signal comprises means for determining the start and end of said selected cycle of said calibration beat frequency, second means for producing second periodic pulses at a period much greater than said period $P_C$, means for counting said second periodic pulses between said start and said end of said calibration beat frequency cycle, the count at said end corresponding to said value $P_C$.

7. The combination as set forth in claim 5 wherein said means producing periodic pulses and second means for producing second periodic pulses are the same means.

8. The combination as set forth in claim 6 wherein said means producing periodic pulses and second means for producing second periodic pulses are the same means.

9. The combination as set forth in claim 4 further including means responsive to said real target beat frequency signal for producing a signal pulse indicative of approximately the half-way point between the start and end of said real target beat frequency signal and wherein said means for determining the start and end of said selected cycle of said calibration beat frequency signal is responsive to said signal pulse for determining said selected cycle.

10. The combination as set forth in claim 5 further including means responsive to said real target beat frequency signal for producing a signal pulse indicative of approximately the half-way point between the start and end of said real target beat frequency signal and wherein said means for determining the start and end of said selected cycle of said calibration beat frequency signal is responsive to said signal pulse for determining said selected cycle.

* * * * *